(12) United States Patent
Sun et al.

(10) Patent No.: US 12,531,303 B2
(45) Date of Patent: Jan. 20, 2026

(54) CELL, BATTERY MODULE, BATTERY PACK, AND VEHICLE

(71) Applicant: BYD COMPANY LIMITED, Guangdong (CN)

(72) Inventors: Huajun Sun, Shenzhen (CN); Zhipei Lu, Shenzhen (CN); Yan Zhu, Shenzhen (CN); Shichao Hu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 741 days.

(21) Appl. No.: 17/792,657

(22) PCT Filed: Jan. 12, 2021

(86) PCT No.: PCT/CN2021/071241
§ 371 (c)(1),
(2) Date: Jul. 13, 2022

(87) PCT Pub. No.: WO2021/143668
PCT Pub. Date: Jul. 22, 2021

(65) Prior Publication Data
US 2023/0041144 A1 Feb. 9, 2023

(30) Foreign Application Priority Data

Jan. 13, 2020 (CN) .......................... 202010033066.6

(51) Int. Cl.
*H01M 50/211* (2021.01)
*H01M 50/103* (2021.01)
(Continued)

(52) U.S. Cl.
CPC ....... *H01M 50/211* (2021.01); *H01M 50/103* (2021.01); *H01M 50/105* (2021.01);
(Continued)

(58) Field of Classification Search
CPC ............. H01M 50/211; H01M 50/249; H01M 50/121; H01M 50/124; H01M 50/209;
(Continued)

(56) References Cited

U.S. PATENT DOCUMENTS

| 3,078,329 | A | 2/1963 | Granger | |
|---|---|---|---|---|
| 11,522,242 | B2 * | 12/2022 | Satou | ................... H01M 50/276 |
| 2021/0126231 | A1 * | 4/2021 | Wang | ................... H01M 50/209 |

FOREIGN PATENT DOCUMENTS

| CN | 201655905 U | 11/2010 |
|---|---|---|
| CN | 102916145 A | 2/2013 |

(Continued)

OTHER PUBLICATIONS

International Search Report and Written Opinion for Application No. PCT/CN2021/071241, mailed on Apr. 8, 2021, 16 pages.

*Primary Examiner* — Jane J Rhee
(74) *Attorney, Agent, or Firm* — Sheppard Mullin Richter & Hampton LLP (57) ABSTRACT

A cell includes a metal housing and multiple electrode core strings encapsulated in the metal housing. The multiple electrode core strings are arranged in a second direction and sequentially connected in series. Each of the electrode core strings includes an encapsulation film and multiple electrode core assemblies arranged in a first direction and sequentially connected in series. The electrode core assemblies are encapsulated in the encapsulation film. An air pressure between the metal housing and the encapsulation film is lower than an air pressure outside the metal housing.

34 Claims, 6 Drawing Sheets

(51) Int. Cl.
*H01M 50/105* (2021.01)
*H01M 50/119* (2021.01)
*H01M 50/121* (2021.01)
*H01M 50/124* (2021.01)
*H01M 50/133* (2021.01)
*H01M 50/209* (2021.01)
*H01M 50/249* (2021.01)

(52) U.S. Cl.
CPC ....... *H01M 50/119* (2021.01); *H01M 50/121* (2021.01); *H01M 50/124* (2021.01); *H01M 50/133* (2021.01); *H01M 50/209* (2021.01); *H01M 50/249* (2021.01); *H01M 2220/20* (2013.01)

(58) Field of Classification Search
CPC ............. H01M 50/105; H01M 50/133; H01M 50/119; H01M 50/103; H01M 2220/20
See application file for complete search history.

(56) References Cited

FOREIGN PATENT DOCUMENTS

| | | |
|---|---|---|
| CN | 104412409 A | 3/2015 |
| CN | 207781826 U | 8/2018 |
| CN | 108615828 A | 10/2018 |
| CN | 108780856 A | 11/2018 |
| CN | 209150179 U | 7/2019 |
| CN | 110268550 A | 9/2019 |
| CN | 110518174 A | 11/2019 |
| CN | 108780856 B | 12/2019 |
| CN | 110828717 A | 2/2020 |
| EP | 3528312 A1 | 8/2019 |
| JP | 2012146588 A | 8/2012 |
| JP | 2016046113 A | 4/2016 |
| JP | 2017168439 A | 9/2017 |
| WO | 2015140952 A1 | 4/2017 |

\* cited by examiner

CELL, BATTERY MODULE, BATTERY PACK, AND VEHICLE

CROSS-REFERENCE TO RELATED APPLICATIONS

This application is a national phase application of International Patent Application No. PCT/CN2021/071241, filed with the China National Intellectual Property Administration (CNIPA) on Jan. 12, 2021, which is based on and claims priority to and benefits of Chinese Patent Application No. 202010033066.6, filed on Jan. 13, 2020. The entire content of all of the above-identified applications is incorporated herein by reference.

FIELD

The present disclosure relates to the field of batteries, and more specifically, to a cell, a battery module, a battery pack, and an electric vehicle.

BACKGROUND

A battery pack applied to an electric vehicle generally includes multiple cells to increase the battery capacity, and the multiple cells are arranged in a case of the battery pack.

Electrolyte solution needs to be filled during a manufacturing process of the cell, so the cell needs to be sealed to prevent leakage of the electrolyte solution. In the related art, generally, an electrode core is sealed in a housing directly, an electrolyte solution is then injected into the housing through an injection port, and subsequently the injection port is sealed, to obtain a cell. However, in the above method, since the electrode core and the electrolyte solution are directly encapsulated in the housing of the cell, leakage of the electrolyte solution is easily caused once the housing is damaged, and thus the cell has a poor sealing effect.

In addition, in order to increase the cell capacity, multiple electrode cores are connected in series in the housing of the cell. In the case of vibration and bumping, the multiple electrode cores are easily moved in the housing. The relative displacement between the electrode cores thereby causes damage to the electrode cores, such as damage to a current collector, wrinkling of a separator, and detachment of an active-material layer from an electrode plate. In this case, the cell has a poor stability, which is prone to safety issues.

SUMMARY

The present disclosure resolves at least one of the technical problems in the related art Therefore, the present disclosure provides a cell. The cell has a better sealing effect, higher safety performance, and higher heat dissipation efficiency. A length value thereof may be set larger while strength requirements can be met.

A cell includes a metal housing and multiple electrode core strings encapsulated in the metal housing. The multiple electrode core strings are arranged in a second direction and sequentially connected in series. Each of the electrode core strings includes an encapsulation film and multiple electrode core assemblies arranged in a first direction and sequentially connected in series. The electrode core assemblies are encapsulated in the encapsulation film. An air pressure between the metal housing and the encapsulation film is lower than an air pressure outside the metal housing.

Therefore, by encapsulating the electrode core assemblies in the encapsulation film and encapsulating the electrode core assemblies in the metal housing for a double sealing, the sealing effect can be effectively improved by virtue of a double-layer sealing effect of the encapsulation film and the metal housing. Secondly, a difference in air pressure between the metal housing and the encapsulation film is lower than an air pressure outside the metal housing, so that the metal housing and the internal electrode core assemblies are as close as possible to reduce an internal gap to prevent the electrode core assemblies from moving in the metal housing and prevent a relative displacement between the electrode core assemblies, reducing the occurrence of cases such as damage to a current collector, wrinkling of a separator, and detachment of an active material, thereby improving the mechanical strength of the entire cell, prolonging the service life of the cell, and improving the safety performance of the cell.

A battery module is provided, which includes a number of the cells according to any one of the foregoing.

A battery pack is provided, which includes a cell array. The cell array includes multiple cells. The cell includes a metal housing and multiple electrode core strings encapsulated in the metal housing. The multiple electrode core strings are arranged in a second direction and sequentially connected in series. Each of the electrode core strings includes an encapsulation film and multiple electrode core assemblies arranged in a first direction and sequentially connected in series. The electrode core assemblies are encapsulated in the encapsulation film. An air pressure between the metal housing and the encapsulation film is lower than an air pressure outside the metal housing.

An electric vehicle is provided, which includes the battery pack according to any one of the foregoing.

Additional aspects and advantages of the present disclosure will be given in the following description, some of which will become apparent from the following description or may be learned from practices of the present disclosure.

BRIEF DESCRIPTION OF THE DRAWINGS

The above and/or additional aspects and advantages of the present disclosure will become apparent and comprehensible in the embodiment description made with reference to the following accompanying drawings, where.

DETAILED DESCRIPTION

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are exemplary and used only for explaining the present disclosure, and should not be construed as a limitation on the present disclosure.

In the description of the present disclosure, it should be understood that a direction or location relationship indicated by a term "center", "on", "under", "front", "rear", "left", "right", "vertical", "horizontal", "top", "bottom", "inner", "outer", or the like is a direction or location relationship shown based on the accompanying drawings, and is intended only to conveniently describe the present disclosure and simplify the description, but is not intended to indicate or imply that a mentioned apparatus or element needs to have a particular direction and is constructed and operated in the particular direction. Therefore, the direction or location relationship shall not be understood as a limitation on the present disclosure.

It should be noted that the terms "first" and "second" are used for descriptive purposes only and should not be construed as indicating or implying relative importance or implicitly indicating the number of technical features indicated. Therefore, a feature defined by "first" or "second" can explicitly or implicitly includes one or more features. Further, in the description of the present disclosure, unless otherwise stated, "a plurality of" means two or more than two.

A cell 100, a battery pack 200, a battery module 300, and an electric vehicle 1000 according to the embodiments of the present disclosure will be described below with reference to FIG. 1 to FIG. 10.

As shown in FIG. 1 to FIG. 5 and FIG. 8, the present disclosure provides a cell 100. The cell 100 refers to, for example, a cell used for forming a battery pack. The cell 100 includes a metal housing 11, and multiple electrode core strings 14 encapsulated in the metal housing 11. The multiple electrode core strings are arranged in a second direction B and sequentially connected in series. Each electrode core string 14 includes an encapsulation film 13 and multiple electrode core assemblies 12 arranged in a first direction A and sequentially connected in series. The electrode core assembly 12 includes at least one electrode core. The electrode core assemblies 12 are encapsulated in the encapsulation film 13. An air pressure between the metal housing 11 and the encapsulation film 13 is lower than an air pressure outside the metal housing 11.

In the cell of the present disclosure, by encapsulating the electrode core assemblies 12 in the encapsulation film 13 and encapsulating the electrode core assemblies 12 in the metal housing 11 for a double sealing, the sealing effect can be effectively improved by virtue of a double-layer sealing effect of the encapsulation film 13 and the metal housing 11. Further, a difference in air pressure between the metal housing 11 and the encapsulation film 13 is lower than an air pressure outside the metal housing 11, so that the metal housing 11 and the electrode core assemblies 12 are as close as possible to reduce an internal gap to prevent the electrode core assemblies 12 from moving in the metal housing 11 and to prevent a relative displacement between the electrode core assemblies 12. As such, the occurrence of cases such as damage to a current collector, wrinkling of a separator, and detachment of an active material can be reduced, thereby improving the mechanical strength of the entire cell 100, prolonging the service life of the cell 100, and improving the safety performance of the cell 100.

Therefore, when the cell 100 is mounted in a case of the battery pack 200, the arrangement of support structures such as cross beams and longitudinal beams in the case of the battery pack 200 can be reduced. Directly mounting the cell 100 on the case of the battery pack 200 by using the cell 100 itself as a support can save an internal space of the battery pack 200, thereby improving the volume utilization of the battery pack 200 and helping reduce the weight of the battery pack 200.

In some embodiments, the electrode core assembly 12 includes a first electrode 121 and a second electrode 122 for leading out a current. The electrode core assembly 12 includes an electrode core assembly body 123. The first electrode 121 and the second electrode 122 for leading out the current that are electrically connected to the electrode core assembly body 123. The first electrode 121 of one electrode core assembly 12 of two electrode core assemblies 12 connected in series is connected to the second electrode 122 of the other electrode core assembly 12. By connecting multiple electrode core assemblies 12 in series, the capacity and voltage of the cell 100 can be improved, thereby reducing the manufacturing process and cost.

In the present disclosure, the electrode core mentioned is an electrode core commonly used in the field of power batteries. The electrode core and the electrode core assembly 12 are components inside the housing of the cell 100 and shall not be understood as the cell 100 itself. The cell 100 is a mono-cell. The electrode core may be formed by winding or laminating. Generally, the electrode core includes at least a positive electrode plate, a separator, and a negative electrode plate. It should be noted that the cell 100 mentioned in the present disclosure is an independent mono-cell and shall not be simply understood as the battery module 300 or the battery pack because it includes multiple electrode cores.

In the present disclosure, the electrode core assembly 12 may be composed of a single electrode core, or may include at least two electrode cores connected in parallel. For example, two electrode cores are connected in parallel to form the electrode core assembly 12, or four electrode cores are connected in parallel to form the electrode core assembly 12.

It should be noted that a series connection manner in this embodiment may be a series connection between adjacent electrode core assemblies 12. In a specific implementation, the first electrode 121 and the second electrode 122 on the adjacent electrode core assemblies may be directly connected, or may be electrically connected by an additional conductive component.

Specifically, if the electrode core assembly 12 includes only one electrode core, the first electrode 121 and the second electrode 122 may be respectively a positive electrode tab and a negative electrode tab of the electrode core, or may be respectively a negative electrode tab and a positive electrode tab.

If the electrode core assembly 12 includes multiple electrode cores, the first electrode 121 may be a lead-out component formed by combining and welding positive electrode tabs of the multiple electrode cores together and the second electrode 122 may be a lead-out component formed by combining and welding negative electrode tabs of the multiple electrode cores together, or the first electrode 121 may be a lead-out component formed by combining and welding negative electrode tabs of the multiple electrode cores together and the second electrode 122 may be a lead-out component formed by combining and welding positive electrode tabs of the multiple electrode cores together.

The "first" and "second" of the first electrode 121 and the second electrode 122 are only used for name distinguishing, but are not used for quantity limiting. For example, there may be one or more first electrodes 121.

Figure 8:
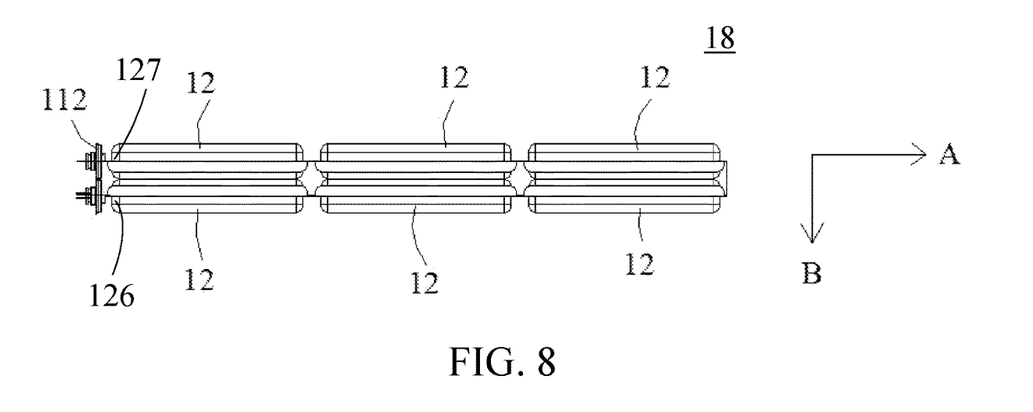
FIG. 8 is a schematic structural diagram in which two electrode core strings are included in a cell according to an embodiment of the present disclosure (a housing body is omitted)

In an embodiment, as shown in FIG. 8, the cell 100 includes two electrode core strings 14. The electrode core strings 14 have end portions opposite to each other along the first direction A. The two electrode core strings 14 are connected in series by two electrode core assemblies 12 at the same end portion. By encapsulating two electrode core strings 14 in a metal housing 11 and connecting the two electrode core strings 14 in series by two electrode core assemblies 12 at the same end portion, that is, the two electrode core strings 14 may be arranged in a "U" shape, a cell 100 with a relatively large length can be manufactured more conveniently, which can reduce cost, and can also increase the heat dissipation efficiency of the cell 100. Therefore, a cell 100 with a large length and a good strength can be easily obtained through the solutions of the present disclosure.

Specifically, the arrangement of the first electrode 121 and the second electrode 122 of the electrode core assembly 12 in one electrode core string 14 is opposite to the arrangement of the first electrode 121 and the second electrode 122 of the electrode core assembly 12 in the other electrode core string 14. In this case, the series connection of two electrode core strings 14 can be achieved by connecting the first electrode 121 of one electrode core assembly 12 to the second electrode 122 of the other electrode core assembly 12 of two electrode core assemblies 12 in series at the same end portions. An electrical connection path of this series connection is short, which is beneficial to simplification of structure design and reduction of the cost. In addition, this structure can also allow the first electrode 121 and the second electrode 122 of the cell 100 to be led out from the same side, which helps externally arrange an electrical connector for electrically connecting multiple cells 100.

It should be noted that the quantity of the electrode core string 14 may be set according to an actual need. For example, three electrode core strings 14 are sequentially connected in series, or four electrode core strings 14 are sequentially connected in series.

Further, the metal housing 11 includes a housing body 111 having an opening and a cover plate 112. The cover plate 112 is separately connected to the opening of the housing body 111 in a sealed manner to form a sealed accommodating chamber 15. The electrode core string 14 is arranged in the accommodating chamber 15. Multiple electrode core strings 14 are sequentially connected in series to form a cell core assembly 18. Two ends of the cell core assembly 18 respectively include the first electrode 126 and the second electrode 127. The first electrode 126 and the second electrode 127 of the cell core assembly 18 are led out from the cover plate 112.

In an embodiment, a cell 100 includes three electrode core strings 14. The three electrode core strings 14 are respectively defined as a first electrode core string, a second electrode core string, and a third electrode core string. The first electrode core string, the second electrode core string, and the third electrode core string are arranged in the second direction B and are sequentially connected in series to form a cell core assembly. The first electrode core string and the second electrode core string are connected in series by two electrode core assemblies 12 at the same end portion. The second electrode core string and the third electrode core string are connected in series by two electrode core assemblies 12 at the same end portion. One of the first electrode and the second electrode of the cell core assembly is an electrode of the electrode core assembly 12 that is arranged at an end portion of the first electrode core string and not connected to the second electrode core string in series. The other of the first electrode and the second electrode of the cell core assembly is an electrode of the electrode core assembly 12 that is arranged at an end portion of the third electrode core string and not connected to the second electrode core string in series.

For example, the first electrode core string, the second electrode core string, and the third electrode core string all include three electrode core assemblies 12 sequentially arranged in the first direction A and connected in series. The three electrode core assemblies 12 are respectively defined as a first electrode core assembly, a second electrode core assembly, and a third electrode core assembly. The first electrode core string and the second electrode core string are connected in series by two electrode core assemblies 12 (that is, respective third electrode core assemblies) at the same end portion. The second electrode core string and the third electrode core string are connected in series by two electrode core assemblies 12 (that is, respective first electrode core assemblies) at the same end portion. One of the first electrode and the second electrode of the cell core assembly is an electrode of the electrode core assembly 12 (that is, the first electrode core assembly) that is arranged at an end portion of the first electrode core string and not connected to the second electrode core string in series. The other of the first electrode and the second electrode of the cell core assembly is an electrode of the electrode core assembly 12 (that is, the third electrode core assembly) that is arranged at an end portion of the third electrode core string and not connected to the second electrode core string in series. In some implementations, there may be openings at two ends of the housing body 111, and there may be two cover plates 112, so that the two cover plates 112 are respectively connected to the openings at the two ends of the housing body 111 in a sealed manner to form a sealed accommodating chamber. In this manner, the first electrode and the second electrode of the cell core assembly may be led out from the same cover plate 112, or may be respectively led out from the two cover plates 112. This is not limited herein.

In some implementations, there may be only one opening provided at an end of the housing body 111, and there may be one cover plate 112, so that the cover plate 112 is connected to the opening at the end of the housing body 111 in a sealed manner. In this manner, the first electrode and the second electrode of the cell core assembly are led out from the same cover plate 112.

In an embodiment of the present disclosure, the electrode core assemblies 12 are encapsulated in the encapsulation film 13, that is, the encapsulation film 13 is further arranged between the metal housing 11 and the electrode core assemblies 12. Therefore, the double sealing for the electrode core assemblies 12 can be achieved through the encapsulation film 13 and the metal housing 11, which helps improve the sealing effect of the cell 100. It may be understood that an electrolyte solution is further injected into the encapsulation film 13. Therefore, through the above manners, the contact between the electrolyte solution and the metal housing 11 can also be avoided, thereby avoiding corrosion of the metal housing 11 or decomposition of the electrolyte solution.

An air pressure between the metal housing 11 and the encapsulation film 13 is lower than an air pressure outside the metal housing 11.

In the present disclosure, the "air pressure" is the pressure within the atmosphere of Earth. An air pressure measures force per unit area, which is equal to a weight of a vertical air column extending upward to the upper limit of the atmosphere per unit area.

The air pressure between the metal housing 11 and the encapsulation film 13, that is, the air pressure in a space between the metal housing 11 and the encapsulation film 13, is lower than the air pressure outside the metal housing 11. Therefore, in this embodiment of the present disclosure, there is a negative pressure state between the metal housing 11 and the encapsulation film 13, so that the metal housing 11 is dented or deformed under the air pressure. As a result, the gap between the metal housing 11 and the electrode core assembly 12 is reduced correspondingly, that is, the space in which the electrode core assemblies 12 move or have a displacement therebetween is reduced, and thus the movement of the electrode core assemblies 12 and the relative displacement between the electrode core assemblies 12 can be reduced, thereby improving the stability of the cell 100, as well as the strength of the cell 100 and the safety performance of the cell 100.

For example, air may be exhausted from the space between the metal housing 11 and the encapsulation film 13, so that there is a negative pressure state between the metal housing 11 and the encapsulation film 13. In this way, the metal housing 11 and the internal electrode core assemblies 12 are as close as possible to reduce the internal gap to prevent the electrode core assemblies 12 from moving in the metal housing 11 and prevent the relative displacement between the electrode core assemblies 12. As such, the occurrence of cases such as damage to the current collector, wrinkling of the separator, and detachment of the active material are reduced, thereby improving the mechanical strength of the entire cell 100, prolonging the service life of the cell 100, and improving the safety performance of the cell 100.

In an implementation, an air pressure between the metal housing 11 and the encapsulation film 13 is P1, where a value of P1 may range from −100 kPa to −5 kPa. In another implementation, a value of P1 may range from −75 kPa to −20 kPa. Certainly, a person skilled in the art may set a value of P1 according to an actual need. It should be noted that the space between the metal housing 11 and the encapsulation film 13 may be in a vacuum state.

An air pressure inside the encapsulation film 13 is P2, where a relationship between P1 and P2 satisfies that: a ratio between P1 and P2 is 0.05 to 0.85. A value of P2 may be −100 kPa to −20 kPa.

P1, P2, and a ratio between P1 and P2 may be set within the above range. In the present disclosure, a double sealing mode is adopted for the electrode core assemblies 12. The electrode core assemblies 12 are first encapsulated in the encapsulation film 13, and in order to prevent the encapsulation film 13 from being damaged as a result of bulging outward due to an excessively large internal air pressure, the air pressure between the metal housing 11 and the encapsulation film 13 is set to be greater than the air pressure inside the encapsulation film 13. In addition, it has been verified through a large number of experiments that when a ratio between P1 and P2 falls within the above range, the reliability of the double sealing of the cell 100 is better ensured, an interface between electrode plates of the cell 100 is also ensured, and a gap between the electrode plates is reduced, so that lithium ions can be better conducted.

In some implementations, the air pressure inside the encapsulation film 13 is lower than the air pressure between the metal housing 11 and the encapsulation film 13.

Figure 1:
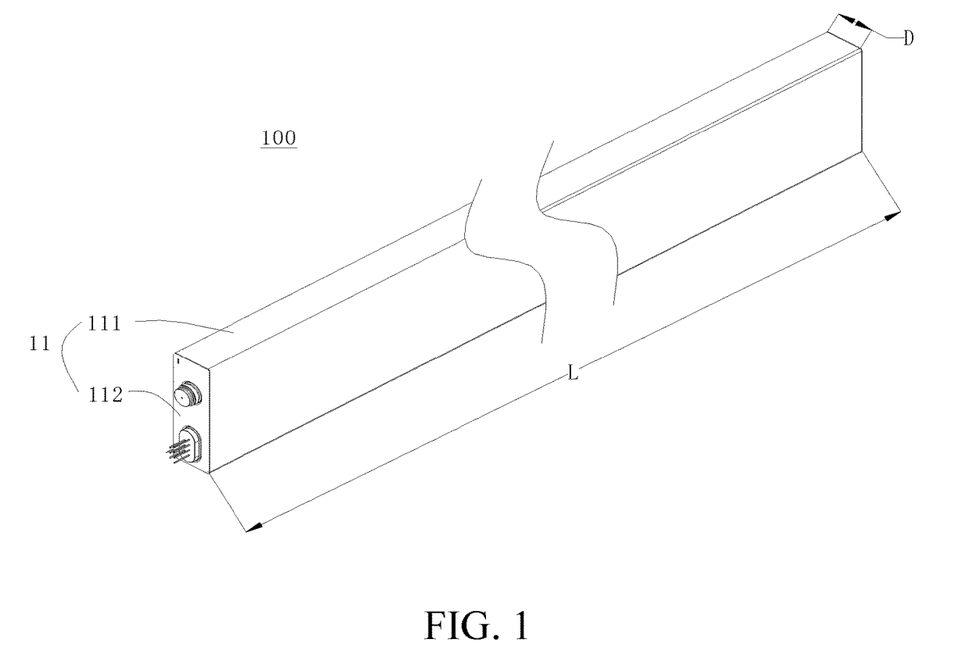
FIG. 1 is a schematic of a three-dimensional structural diagram of a cell according to an embodiment of the present disclosure.
Figure 2:
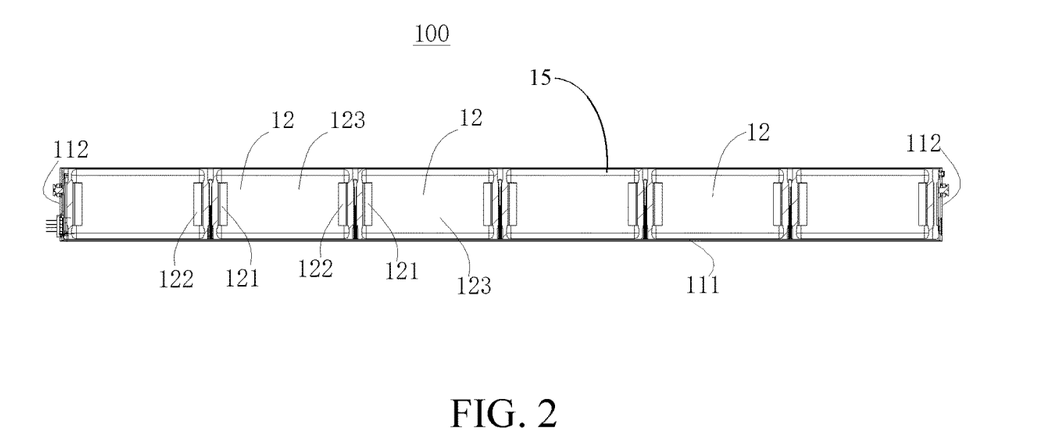
FIG. 2 is a schematic of a cross-sectional view of a cell according to an embodiment of the present disclosure.
Figure 3:
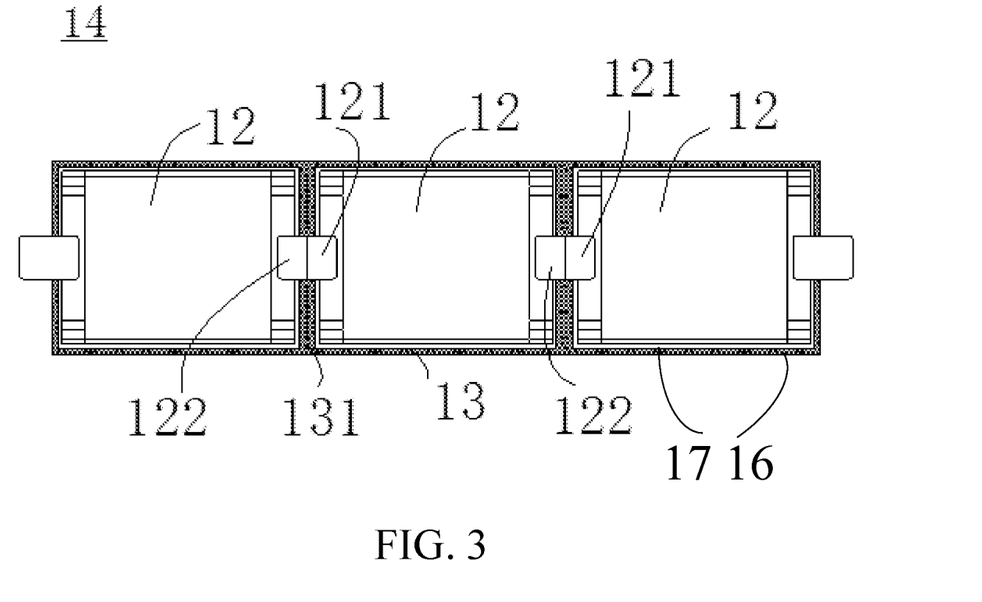
FIG. 3 is a schematic diagram in which electrode core assemblies are encapsulated in an encapsulation film according to an embodiment of the present disclosure.

In an embodiment of the present disclosure, as shown in FIG. 3, the electrode core string 14 includes one encapsulation film 13. Multiple electrode core assemblies 12 included in each of the corresponding electrode core strings 14 are encapsulated in the same encapsulation film 13. The electrode core assembly 12 includes the electrode core assembly body 123, and the first electrode 121 and the second electrode 122 for leading out a current. A junction of the first electrode 121 and the second electrode 122 for connecting two electrode core assemblies 12 in series is in the encapsulation film 13. That is, the encapsulation film 13 of each electrode core string 14 is integrally arranged, and multiple electrode core assemblies 12 included in each electrode core string 14 are encapsulated in the same encapsulation film 13.

During actual applications, for example, as shown in FIG. 3, multiple electrode core assemblies 12 may be connected in series first, and then the electrode core assemblies 12 connected in series are wrapped by using a whole piece of the encapsulation film 13. For example, the electrode core assemblies 12 connected in series may be placed on a part of the encapsulation film 13 (or a recess may be provided on a part of the encapsulation film 13 in advance, and then the multiple electrode core assemblies 12 connected in series are placed in the recess), and then the remaining part of the encapsulation film 13 is folded toward the electrode core assemblies 12. Afterward, two parts of the encapsulation film 13 are hot melted for sealing, so that the electrode core assemblies 12 connected in series are encapsulated in the same encapsulation film 13.

An encapsulation portion 131 is formed at a position of the encapsulation film 13 corresponding to the first electrode 121 and/or the second electrode 122 to separate two adjacent electrode core assembly bodies 123 from each other, and at least one of the first electrode 121 of one electrode core assembly 12 of two adjacent electrode core assemblies 12 and the second electrode 122 of the other electrode core assembly 12 is arranged in the encapsulation portion 131. Multiple electrode core assembly bodies 123 are separated from each other through the encapsulation portion 131 to prevent electrolyte solutions of multiple electrode core assemblies 12 from circulating through each other, so that the multiple electrode core assemblies 12 do not affect each other and the electrolyte solutions in the multiple electrode core assemblies 12 are not decomposed due to an excessively large potential difference, thereby ensuring the safety and the service life of the cell 100.

The encapsulation portion 131 may be implemented in multiple manners. For example, the encapsulation portion 131 may be formed by fastening the encapsulation film 13 tightly using a tie, or the encapsulation portion 131 may be formed by directly hot melting the encapsulation film 13.

Figure 4:
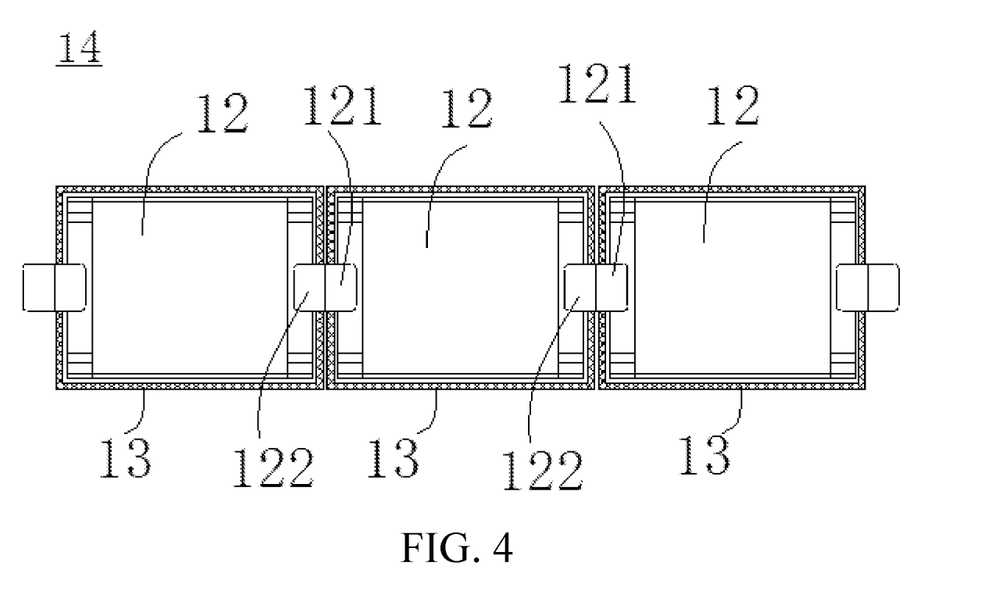
FIG. 4 is another schematic diagram in which electrode core assemblies are encapsulated in encapsulation films according to an embodiment of the present disclosure.

In another embodiment of the present disclosure, as shown in FIG. 4, the electrode core string 14 includes multiple encapsulation films 13. At least one electrode core assembly 12 is encapsulated in one encapsulation film 13. The electrode core assemblies 12 are connected in series.

In other words, the quantity of the encapsulation film 13 included in each electrode core string 14 is in one-to-one correspondence to the quantity of the electrode core assembly 12 included in the electrode core string 14, and each electrode core assembly 12 is individually encapsulated in an encapsulation film 13. In this implementation, after multiple electrode core assemblies 12 are prepared, each electrode core assembly 12 may be individually sleeved with an encapsulation film 13, and then the electrode core assemblies 12 are connected in series.

At least one of the first electrode 121 and the second electrode 122 of the electrode core assembly 12 extends out of the encapsulation film 13. For example, the first electrode 121 may extend out of the encapsulation film 13, or the second electrode 122 may extend out of the encapsulation film 13, or both the first electrode 121 and the second electrode 122 may extend out of the encapsulation film 13. At least one first electrode 121 and/or second electrode 122 is extended out of the encapsulation film 13, so that the extended electrode may be connected to other electrode core assemblies 12 in series.

In an embodiment of the present disclosure, an arrangement direction of multiple electrode core assemblies 12 is the first direction A. A length direction of the electrode core assembly 12 extends in the first direction A, and a length of the cell 100 also extends in the first direction A. That is, the multiple electrode core assemblies 12 are sequentially arranged in a length direction of the cell 100. The first electrode 121 and the second electrode 122 of the electrode core assembly 12 are respectively arranged at two sides of the electrode core assembly 12 along the first direction A. That is, the multiple electrode core assemblies 12 are arranged in a "head-to-head" manner. In this arrangement manner, it is easier to achieve pairwise a series connection between the electrode core assemblies 12, and a connection structure is simple. In addition, in this arrangement manner, it is easier to manufacture a cell 100 with a relatively large length. Therefore, when the cell 100 is mounted in a case of a battery pack, it is unnecessary to arrange support structures such as cross beams and longitudinal beams. Instead, the cell 100 is directly mounted on the case of the battery pack 200 by using the metal housing 11 of the cell 100, so that the internal space of the battery pack 200 can be saved, thereby improving the volume utilization of the battery pack 200 and helping reduce the weight of the battery pack 200.

The cell 100 is roughly a cuboid with a length L of 400 mm to 2500 mm (millimeters), such as 500 mm, 1000 mm, or 1500 mm. Compared with an existing manner of arranging only one electrode core, arranging multiple electrode core assemblies 12 in the cell 100 makes it easier to manufacture a cell 100 with a relatively large length. In a conventional cell, once the cell is relatively long, a length of an internal copper-aluminum foil used as a current collector increases correspondingly, greatly increasing a resistance inside the cell and failing to meet current requirements for a higher and higher power and quick charging. In the case of a constant cell length, the resistance inside the cell can be greatly reduced according to this embodiment of the present disclosure, so that the problems caused by cell overheating in the case of high-power output, quick charging, and the like are avoided.

A thickness D of the cell 100 may be greater than 10 mm, for example, within a range of 13 mm to 75 mm.

In an embodiment of the present disclosure, a ratio of the length to the thickness of the cell 100 is 5 to 250.

In an embodiment of the present disclosure, the thickness of the cell 100 extends in the second direction B perpendicular to the first direction A. The metal housing 11 has two opposite first surfaces 113 along the second direction. The first surfaces 113 are largest surfaces of the cell 100, that is, "large surfaces" of the cell 100. At least one of the two opposite first surfaces 113 is recessed toward an interior of the metal housing 11, so that the metal housing 11 and the electrode core assemblies 12 are as close as possible.

Since the metal housing 11 is a relatively thin sheet with a relatively small thickness, a recess 114 on the first surface 113 of the metal housing 11 may be, for example, formed by exhausting the air inside the metal housing 11. That is, when the air is exhausted from the space between the metal housing 11 and the encapsulation film 13 to make the air pressure between the metal housing 11 and the encapsulation film 13 lower than the air pressure outside the metal housing 11, the recess 114 is easily formed on the first surface 113 of the metal housing 11 toward the inside of the metal housing 11 as the air exhaustion proceeds.

During normal use of the cell, the cell usually expands due to expansion of the material itself, generation of gas from the electrolyte solution, and the like, and an area expanding and deforming greatest is often on the large surface of the cell. With this technology, the large surface of the cell in an initial state is set in a slightly depressed state by vacuumizing, which can effectively alleviate the problem of squeezing between cells after the cell expands, thereby improving the life, safety, and other performances of the cell and the whole system.

Figure 5:
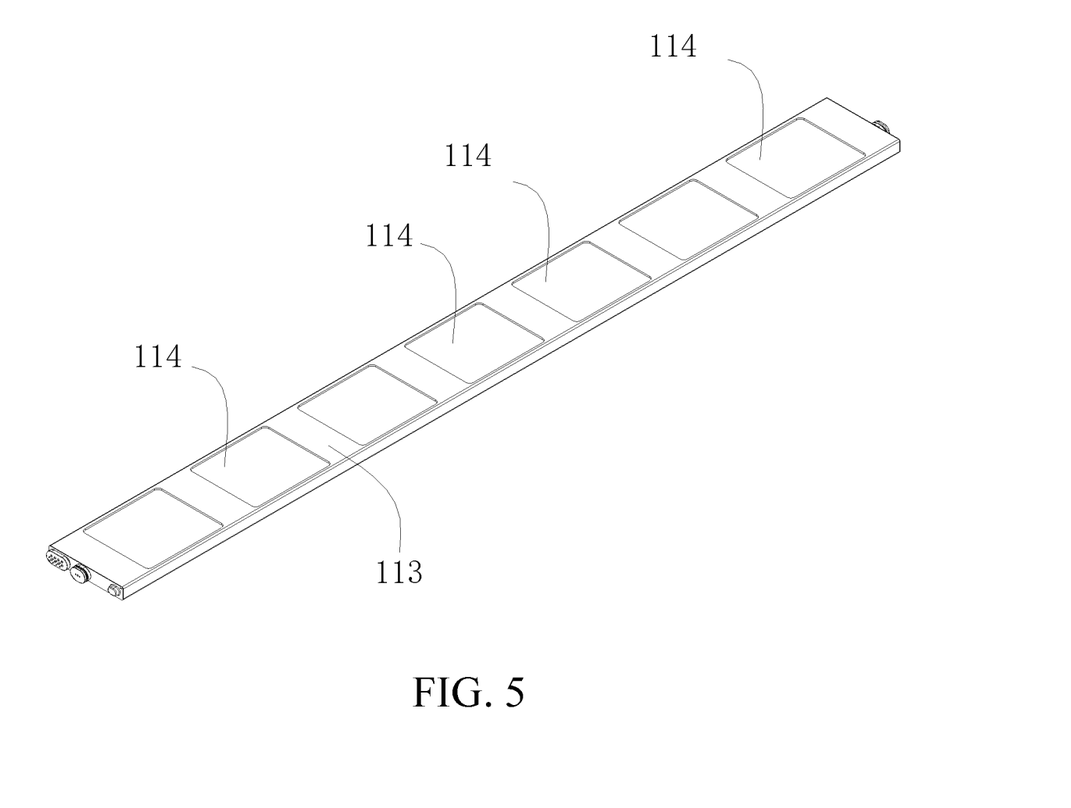
FIG. 5 is a schematic diagram in which recesses are formed on a first surface of a metal housing according to an embodiment of the present disclosure.

In some other embodiments, as shown in FIG. 5, a recess may be formed on the first surface 113 of the metal housing 11 in advance before air is exhausted from the metal housing 11. There may be multiple recesses 114 on the first surface 113 of the metal housing 11. For example, multiple recesses 114 are formed on the first surface 113 in advance, and a position of each recess 114 corresponds to a position where an electrode core assembly 12 is arranged.

In some implementations, the two opposite first surfaces 113 of the metal housing 11 are both recessed inward to clamp the electrode core assemblies 12 through the recessed region.

An exhaust hole may be provided on the metal housing 11. Air is exhausted from the space between the metal housing 11 and the encapsulation film 13 through the exhaust hole. Since the exhaust hole needs to be sealed, a sealing member is further arranged in the exhaust hole for sealing the exhaust hole. The sealing member may be, for example, a plug, a rubber member, and the like, which is not limited herein.

In some implementations, before the metal housing 11 is vacuumed, a gap is provided between inner surfaces of the electrode core assembly 12 and the metal housing 11. The gap is convenient for the electrode core assembly 12 to be mounted into the interior of the metal housing 11. After the metal housing 11 is vacuumed, the metal housing 11 is pressed against an outer surface of the electrode core assembly 12 along the second direction B to clamp the electrode core assemblies 12, thereby reducing a space for the electrode core assembly 12 to move inside the metal housing 11, and improving the safety performance of the cell 100.

The aluminum plastic film has a poor heat dissipation effect and a low strength, and is limited by a manufacturing process. If the aluminum plastic film is used as the case of the cell 100, a cell 100 with a relatively large thickness cannot be manufactured. In an embodiment of the present disclosure, the metal housing 11, different from the aluminum plastic film, has a high strength and a good heat dissipation effect. The metal housing 11 may include but is not limited to an aluminum housing or a steel housing.

In some embodiments, the thickness of the metal housing 11 ranges from 0.05 mm to 1 mm.

If the thickness of the metal housing 11 is relatively large, the weight of the cell 100 is increased and the capacity of the cell 100 is reduced. Moreover, if the thickness of the metal housing 11 is extremely large, under the air pressure, the metal housing 11 is not easily depressed or deformed toward a side of the electrode core assembly 12 to reduce a spacing between the metal housing 11 and the electrode core assembly 12, thereby failing to effectively position the electrode core assembly 12. Additionally, if the metal housing 11 is extremely thick, the cost for air exhaustion is increased, and thus the manufacturing cost is increased correspondingly.

In the present disclosure, the thickness of the metal housing 11 is set within the above range, which not only ensures the strength of the metal housing 11, but also does not reduce the capacity of the cell 100. Further, the metal housing 11 deforms more easily in the negative pressure state, reducing the spacing between the metal housing 11 and the electrode core assembly 12, thereby reducing the movement of the electrode core assembly 12 inside the metal housing 11 and the relative displacement between the electrode core assemblies 12.

In an embodiment, the encapsulation film 13 is an aluminum composite film.

In an embodiment of the present disclosure, the encapsulation film 13 includes a non-metallic outer layer film 16 and a non-metallic inner layer film 17 that are laminated. The inner layer film 17 is arranged between the outer layer film 16 and the electrode core assembly 12.

The inner layer film has better chemical stability and may be made of, for example, a material with a property of anti-corrosion of the electrolyte solution, such as polypropylene (PP), polyethylene (PE), polyethylene terephthalate (PET), or a combination of the above materials.

The outer layer film is a protective layer and may be used to prevent penetration of air, especially water vapor, oxygen, and the like. The outer layer film may be made of, for example, polyethylene terephthalate, polyamide (PA), polypropylene, or a combination of the above materials.

In the encapsulation film 13 of this embodiment, a melting point of the outer layer film is greater than a melting point of the inner layer film, so that during hot melting for sealing, the outer layer film is not melted while the inner layer film can be melted in time to ensure excellent sealing performance. Further, a difference between the melting point of the outer layer film and the melting point of the inner layer film may range from 30° C. to 80° C. For example, the difference between the melting point of the outer layer film and the melting point of the inner layer film may be 50° C., or 70° C., or the like. Selection of a specific material may be determined based on an actual need.

The outer layer film and the inner layer film are bonded by using a binder. For example, the material of the outer layer film may be PP, the material of the inner layer film may be PET, and a binder for bonding the outer layer film and the inner layer film may be, for example, a polyolefin binder, so that a composite film is formed through bonding.

In this embodiment, the electrode core assembly 12 is encapsulated by using the encapsulation film 13 formed from a two-layer non-metallic film. Due to use of the non-metallic encapsulation film 13, which has a higher tensile strength and elongation at break, limitations on the thickness of the cell 100 can be reduced, so that the cell 100 produced has a larger thickness. In this embodiment, the thickness of the cell 100 has a large expandable range, for example, the thickness may be greater than 10 mm, for example, within a range of 13 mm to 75 mm.

In an embodiment of the present disclosure, the cell is a lithium-ion cell.

Figure 9:
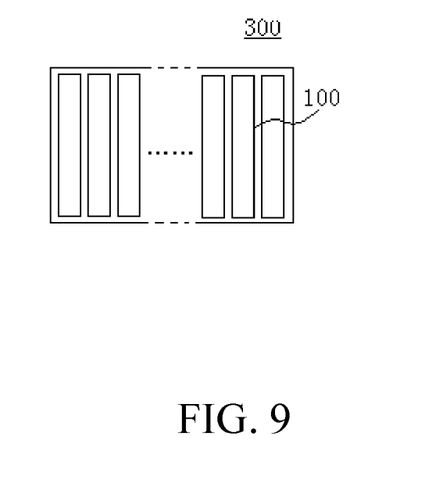
FIG. 9 is a schematic diagram of a battery module according to an embodiment of the present disclosure.

As shown in FIG. 9, according to another aspect of the present disclosure, a battery module 300 is provided, which includes a number of the cells according to any one of the above embodiments. By using the battery module 300 provided by the present disclosure, the sealing performance is relatively good, the assembly process is simple, and the cost of the cell is relatively low.

Figure 6:
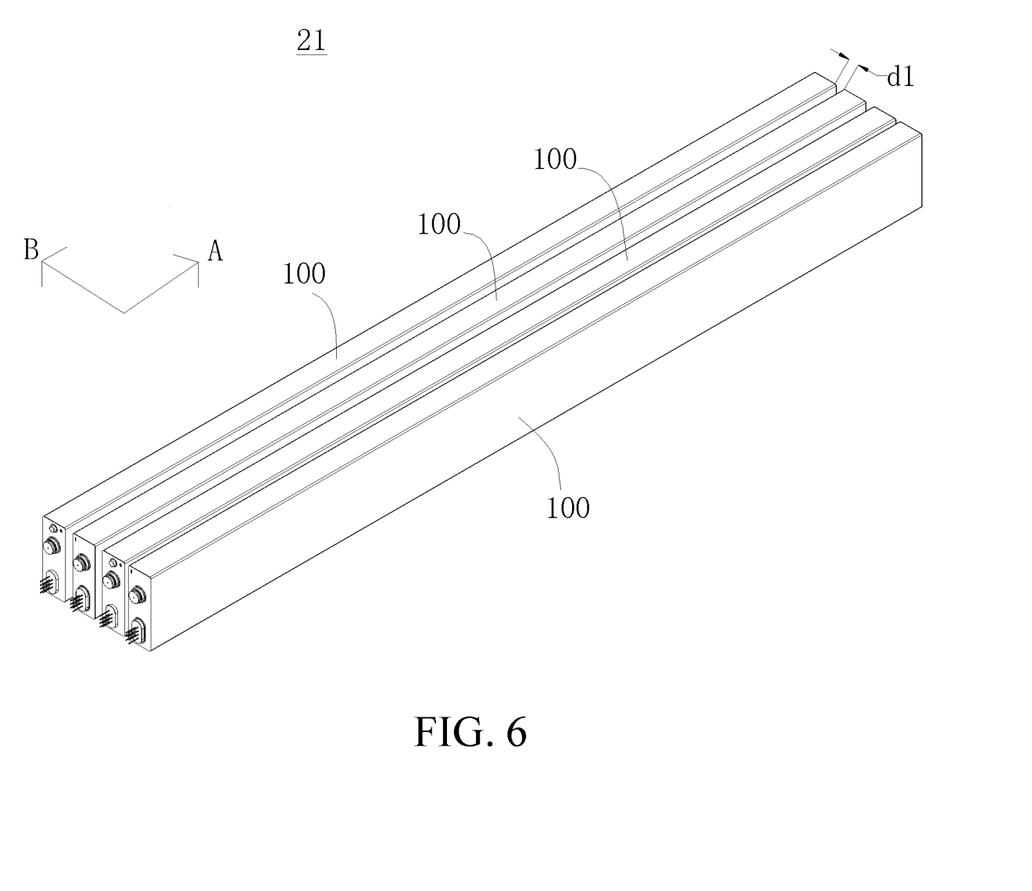
FIG. 6 is a schematic structural diagram of a cell array according to an embodiment of the present disclosure.
Figure 7:
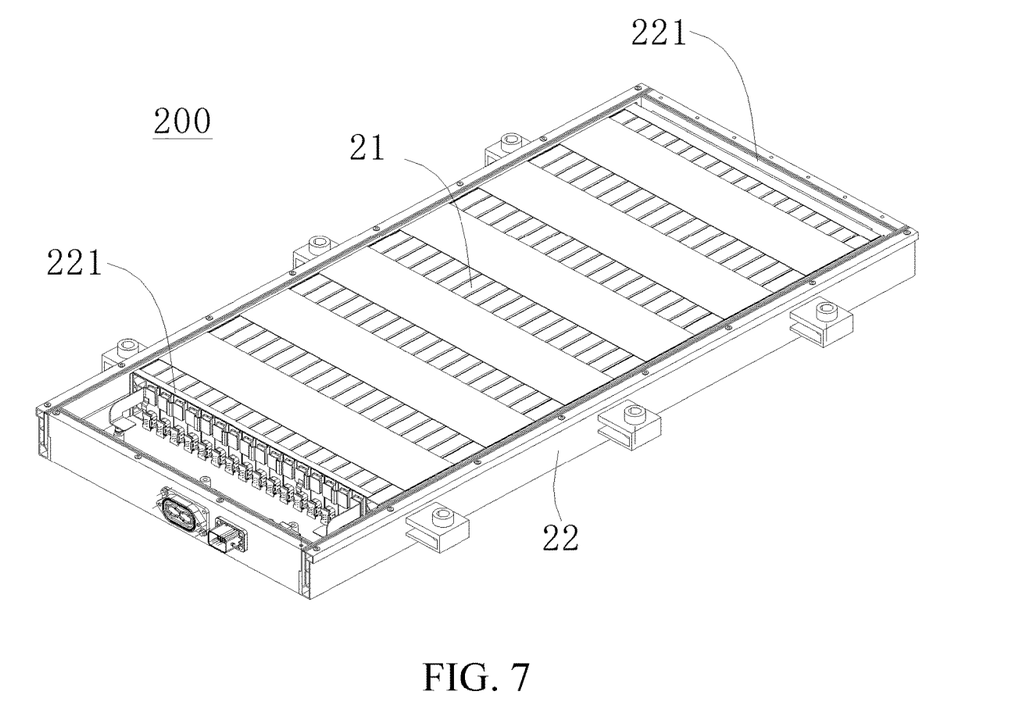
FIG. 7 is a schematic structural diagram of a battery pack according to an embodiment of the present disclosure.

Referring to FIG. 6 and FIG. 7, the present disclosure further provides a battery pack 200, which includes a cell array 21. The cell array 21 includes several cells 100. The cell 100 is described in any one of the above embodiments. Therefore, the specific structure of the cell 100 is not repeated herein.

There may be one or more cell arrays 21 and there may be one or more cells 100 in each cell array 21. In actual production, the quantity of the cell 100 may be set according to an actual need, and the quantity of the cell array 21 may also be set according to an actual need, which are not specifically limited in the present disclosure.

In an embodiment of the present disclosure, the length direction of the cell 100 extends in the first direction A, and a thickness direction of the cell 100 extends in the second direction B perpendicular to the first direction A. The several cells 100 are sequentially arranged in the second direction B to form the cell array 21. A gap is provided between at least two adjacent cells 100, and a ratio of the gap to the thickness of the cell 100 ranges from 0.001 to 0.15.

It should be noted that the gap between two adjacent cells 100 changes as an operation time of the cell increases. However, whether the cell is operating or after operating, or before the cell leaves the factory, as long as the range of the ratio of the gap between the cells to the thickness is within the scope defined by the present disclosure, any case falls within the protection scope of the present disclosure.

In the present disclosure, by reserving a certain gap between the cells 100, a buffer space is reserved for expansion of the cell 100.

The expansion of the cell 100 is associated with the thickness of the cell 100. The larger the thickness of the cell 100 is, the more likely the cell 100 is to expand. In the present disclosure, a ratio of the gap between the cells 100 to the thickness of the cell 100 is set to 0.001 to 0.15, which can not only make full use of a space of the battery pack 200 and improve the utilization of the battery pack 200, but also provide a better buffering effect for the expansion of the cell 100.

In addition, heat is generated when the cell 100 expands. A certain gap is reserved between the cells 100 and the gap may also be used as a heat dissipation passage, such as an air channel. A surface with a larger area of the cell 100 has a better heat dissipation effect, so the heat dissipation efficiency of the battery pack 200 can also be increased, improving the safety performance of the battery pack 200.

In the above solutions, the gap between the cells 100 may be understood as no structural member being arranged between the cells 100, but only a certain space being reserved, or may be understood as an additional structural member being arranged between the cells 100, so that the cells 100 are separated from each other through the structural member.

It should be noted that when a structural member is arranged between the cells 100, the gap between the cells 100 should be understood as a distance between the cells 100 on both sides of the structural member, but shall not be understood as a distance between the structural member and one of the cells 100.

It should be noted that certain gaps may be reserved between the structural member and the cells 100 on both sides of the structural member, or the structural member may be in direct contact with the cells 100 on both sides thereof. When the structural member is in direct contact with the cells 100 on both sides thereof, the structural member should have a certain flexibility, so as to have a buffering effect on the expansion of the cell 100. The structural member may include but is not limited to an aerogel, a thermally conductive structural adhesive, or a heat insulation foam.

In the present disclosure, when there are multiple cell arrays 21, the gap should refer to a spacing between two adjacent cells 100 in the same cell array 21 rather than a spacing between two adjacent cells 100 in different cell arrays 21. In addition, in the same cell array 21, certain gaps may be reserved between all two adjacent cells 100, or certain gaps may be reserved between some of two adjacent cells 100.

In an implementation, the gap between two adjacent cells 100 includes a first gap d1. The first gap d1 is defined as a minimum distance between two cover plates 112 of the two adjacent cells 100 in the second direction B. The thickness of the cell 100 is a size of the cover plate 112 in the second direction B. A ratio of the first gap d1 to the thickness of the cell 100 ranges from 0.005 to 0.1.

In the above implementations, since the cover plate 112 has a relatively high strength, it is less likely for the cover plate 112 to expand than the housing body 111. After the cell 100 operates for a period of time, a chemical reaction occurs inside, and the cell 100 expands to squeeze its adjacent cells 100 and cause the first gap d1 to change (for example, gradually increase). However, this change is relatively small and may be negligible, or even if the first gap changes, the ratio of the first gap to the thickness of the cell 100 still meets the above range.

In the above implementations, the cover plates 112 are respectively arranged at two ends of the housing body 111. When the cells 100 are arranged into the cell array 21 in the thickness direction, the gap between two cells 100 may be a minimum spacing between two cover plates 112 at the same end of the cell array 21 in the second direction B, or may be a minimum spacing of two cover plates 112 at different ends of the cell array 21 in the second direction B.

In an implementation, the gap between two adjacent cells 100 includes a second gap d2. The second gap d2 is a minimum distance between two first surfaces 131 of the two adjacent cells 100 facing each other. The second gap d2 before the use of the cell 100 is greater than the second gap d2 after the use of the cell 100 is used.

"Before use" may be understood as that the cell 100 awaiting to leave the factory or having leaved the factory after assembly is completed has not yet started to supply power to the outside. "After use" may be understood as that the cell 100 has supplied power to the outside. For example, the battery pack 200 is assembled in an electric vehicle 1000. A state before use may be understood as a state of a new vehicle. A state after use should be a state of the vehicle that has been driven for a certain mileage.

In this implementation, the second gap should refer to a minimum spacing between two opposite first surfaces 131 of two adjacent cells 100. The spacing gradually decreases as an operation time of the cell 100 increases, mainly because a spacing between two adjacent large surfaces gradually decreases after the cell 100 expands.

In an embodiment of the present disclosure, the battery pack 200 further includes a battery pack cover and a tray 22, where the battery pack cover is not shown in a view of FIG. 7. The battery pack cover and the tray 22 are connected in a sealed manner to form a battery accommodating cavity, and the cell array 21 is arranged in the battery accommodating cavity. The tray 22 includes a support member 221. A support region is formed on the metal housing 11 of the cell 100. The cells 100 are in butt joint with the support member 221 through the support region, so as to be supported on the support member 221.

Further, the tray 22 includes side beams. The side beams form the support member 221. Both ends of the cell 100 in the length direction are respectively supported on the side beams.

In the cell 100 in this embodiment of the present disclosure, the air pressure between the metal housing 11 and the encapsulation film 13 is a negative pressure, which can improve the overall strength of the cell 100. Therefore, the cell 100 may be directly mounted on the tray 22 by using its own strength as a support, so that it is unnecessary to arrange the structures such as cross beams and longitudinal beams on the tray 22 to support the cell 100, thereby helping improve the utilization of the internal space of the battery pack 200.

Figure 10:
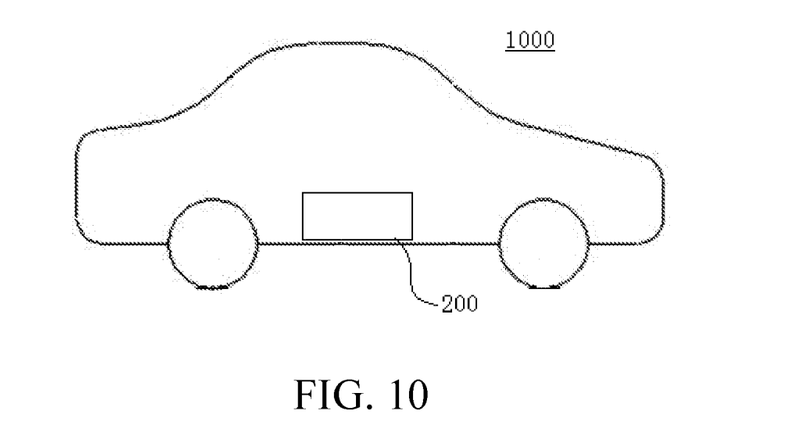
FIG. 10 is a schematic diagram of an electric vehicle according to an embodiment of the present disclosure.

As shown in FIG. 10, an electric vehicle 1000 is provided, which includes the above battery pack 200. The electric vehicle 1000 provided by the present disclosure has high endurance capability and is relatively low in cost.

Cells 100 are arranged in a length direction thereof parallel to a length direction of a vehicle body of the electric vehicle 1000. A length of the vehicle body ranges from 500 mm to 5200 mm.

In the description of the present disclosure, it should be noted that unless otherwise explicitly specified or defined, the terms such as "mount", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the above terms in the present disclosure according to specific situations.

In description of this specification, a description of a reference term such as "an embodiment", "a specific embodiment", or "an example" means that a specific feature, structure, material, or characteristic that is described with reference to the embodiment or the example is included in at least one embodiment or example of the present disclosure. In this specification, schematic descriptions of the above terms do not necessarily point at a same embodiment or example. In addition, the described specific features, structures, materials, or characteristics may be combined in a proper manner in any one or more of the embodiments or examples.

Although the embodiments of the present disclosure have been shown and described, a person of ordinary skill in the art may understand that various changes, modifications, replacements, and variations may be made to the embodiments without departing from the principles and spirit of the present disclosure, and the scope of the present disclosure is as defined by the appended claims and their equivalents.

What is claimed is:

1. A cell, comprising a metal housing and a plurality of electrode core strings encapsulated in the metal housing;

wherein each of the electrode core strings comprises an encapsulation film and a plurality of electrode core assemblies arranged in a first direction and connected in series, the electrode core strings are arranged in a second direction and connected in series, the electrode core assemblies are encapsulated in the encapsulation film, and an air pressure between the metal housing and the encapsulation film is lower than an air pressure outside the metal housing;

wherein the encapsulation film comprises a plurality of encapsulation portions formed at positions on the encapsulation film between two adjacent electrode core assemblies.

2. The cell according to claim 1, wherein each of the electrode core strings has end portions opposite to each other along the first direction, and two adjacent electrode core strings of the electrode core strings are connected in series by two electrode core assemblies at adjacent end portions of the two adjacent electrode core strings.

3. The cell according to claim 1, wherein the first direction is a length direction of the electrode core assemblies or a length direction of the cell.

4. The cell according to claim 1, wherein the second direction is a thickness direction of the cell.

5. The cell according to claim 1, wherein each of the electrode core assemblies comprises a first electrode and a second electrode for leading out a current, and the first electrode and the second electrode are disposed at two ends of the respective electrode core assembly along the first direction.

6. The cell according to claim 1, wherein an air pressure inside the encapsulation film is lower than the air pressure between the metal housing and the encapsulation film.

7. The cell according to claim 1, wherein
each of the electrode core assemblies comprises an electrode core assembly body and a first electrode and a second electrode for leading out a current, and a junction connecting a first electrode of a first electrode core assembly and a second electrode of a second electrode core assembly of two adjacent electrode core assemblies is in the encapsulation film.

8. The cell according to claim 7, wherein each of the encapsulation portions corresponds to the first electrode and/or the second electrode and to separate two adjacent electrode core assembly bodies from each other; and
at least one of the first electrode of the first electrode core assembly and the second electrode of the second electrode core assembly is arranged in the encapsulation portion.

9. The cell according to claim 1, wherein each of the electrode core strings comprises a plurality of encapsulation films, at least one of the electrode core assemblies is encapsulated in each of the encapsulation films, each of the electrode core assemblies comprises a first electrode and a second electrode for leading out a current, and at least one of the first electrode and the second electrode extends out of a corresponding encapsulation film.

10. The cell according to claim 1, wherein the air pressure between the metal housing and the encapsulation film is P1, and P1 ranges from −100 kPa to −5 kPa.

11. The cell according to claim 10, wherein P1 ranges from −75 kPa to −20 kPa.

12. The cell according to claim 11, wherein an air pressure inside the encapsulation film is P2, and a ratio between P1 and P2 is 0.05 to 0.85.

13. The cell according to claim 12, wherein a value of P2 is −100 kPa to −20 kPa.

14. The cell according to claim 1, wherein the metal housing has two opposite first surfaces along the second direction, and at least one of the two opposite first surfaces is recessed toward an interior of the metal housing.

15. The cell according to claim 14, wherein the two opposite first surfaces are recessed toward the interior of the metal housing to clamp the electrode core assemblies.

16. The cell according to claim 1, wherein the encapsulation film comprises an outer layer film and an inner layer film that are laminated on each other, the inner layer film is arranged between the electrode core assemblies and the outer layer film, a melting point of the outer layer film is greater than a melting point of the inner layer film.

17. The cell according to claim 16, wherein a difference between the melting point of the outer layer film and the melting point of the inner layer film is between 30° C. and 80° C.

18. The cell according to claim 16, wherein the outer layer film comprises one or more of polyethylene terephthalate, polyamide, and polypropylene; and the inner layer film comprises one or more of polypropylene, polyethylene, and polyethylene terephthalate.

19. The cell according to claim 18, wherein the outer layer film and the inner layer film are bonded with each other.

20. The cell according to claim 19, further comprising a binder that bonds the outer layer film and the inner layer film, wherein the binder is a polyolefin binder.

21. The cell according to claim 1, wherein the encapsulation film is an aluminum composite film.

22. The cell according to claim 1, wherein the metal housing comprises a housing body having an opening and a cover plate, the cover plate is connected to the opening of the housing body to form a sealed accommodating chamber, the electrode core strings are arranged in the sealed accommodating chamber and are sequentially connected in series to form a cell core assembly, a first end of two ends of the cell core assembly comprises a third electrode and a second end of the two ends of the cell core assembly comprises a fourth electrode, and one of the third electrode and the fourth electrode is led out from the cover plate.

23. The cell according to claim 22, wherein an exhaust hole is provided on the metal housing, and a sealing member is arranged in the exhaust hole.

24. The cell according to claim 1, wherein a thickness of the metal housing ranges from 0.05 mm to 1 mm.

25. A battery module, comprising a plurality of cells, wherein each of the cells is the cell according to claim 1.

26. A battery pack, comprising a cell array, wherein:
the cell array comprises a plurality of cells;
each of the cells comprises a metal housing and a plurality of electrode core strings encapsulated in the metal housing, each of the electrode core strings comprises an encapsulation film and a plurality of electrode core assemblies arranged in a first direction and connected in series, the electrode core strings are arranged in a second direction and connected in series, the electrode core assemblies are encapsulated in the encapsulation film, and an air pressure between the metal housing and the encapsulation film is lower than an air pressure outside the metal housing; and
the encapsulation film comprises a plurality of encapsulation portions formed at positions on the encapsulation film between two adjacent electrode core assemblies.

27. The battery pack according to claim 26, wherein a thickness of each of the cells extends in the second direction, and the cells are sequentially arranged in the second direction to form the cell array; and a gap is provided between two adjacent cells, and a ratio of the gap to a thickness of a cell of the two adjacent cells ranges from 0.001 to 0.15.

28. The battery pack according to claim 27, wherein the metal housing comprises a housing body having an opening and a cover plate, the cover plate is connected to the opening of the housing body to form a sealed accommodating chamber, and the electrode core strings are arranged in the sealed accommodating chamber; and the gap between the two adjacent cells comprises a first gap d1, the first gap is a minimum distance between two cover plates of the two adjacent cells in the second direction, the thickness of the cell of the two adjacent cells is equal to a dimension of one of the two cover plates in the second direction, and a ratio of the first gap d1 to the thickness of the cell of the two adjacent cells ranges from 0.005 to 0.1.

29. The battery pack according to claim 27, wherein the metal housing has two opposite first surfaces along the second direction, the gap between the two adjacent cells comprises a second gap d2, the second gap is a minimum distance between two first surfaces of the two adjacent cells facing each other.

30. The battery pack according to claim 29, wherein the second gap d2 before use of the cells is greater than the second gap d2 after the use of the cells.

31. The battery pack according to claim 27, further comprising a battery pack cover and a tray, wherein the battery pack cover and the tray are connected in a sealed manner to form a battery accommodating cavity, the cell array is arranged in the battery accommodating cavity, the tray comprises a support member to form a support region on the metal housing, and the cells are supported on the support member.

32. The battery pack according to claim 31, wherein a length of the cells extends in the first direction, the first direction is perpendicular to the second direction, the tray comprises side beams forming the support member, and both ends of each of the cells in a length direction are respectively supported on the side beams.

33. An electric vehicle, comprising the battery pack according to claim 26.

34. The electric vehicle according to claim 33, wherein the cells are arranged in a length direction of the cells, and the length direction of the cells is parallel to a length direction of a vehicle body of the electric vehicle.

* * * * *